(12) United States Patent
Thelen

(10) Patent No.: US 8,517,205 B2
(45) Date of Patent: Aug. 27, 2013

(54) PRESSURE VESSEL

(75) Inventor: Arnold Thelen, Idar-Oberstein (DE)

(73) Assignee: Fissler GmbH (DE)

( * ) Notice: Subject to any disclaimer, the term of this patent is extended or adjusted under 35 U.S.C. 154(b) by 129 days.

(21) Appl. No.: 12/937,674

(22) PCT Filed: Sep. 15, 2009

(86) PCT No.: PCT/EP2009/006663
§ 371 (c)(1),
(2), (4) Date: Oct. 13, 2010

(87) PCT Pub. No.: WO2010/049036
PCT Pub. Date: May 6, 2010

(65) Prior Publication Data
US 2011/0031249 A1 Feb. 10, 2011

(30) Foreign Application Priority Data
Oct. 30, 2008 (DE) .......................... 10 2008 053 912

(51) Int. Cl.
*F17C 13/06* (2006.01)
*B65D 41/06* (2006.01)
(52) U.S. Cl.
USPC .......................................... 220/582; 220/293
(58) Field of Classification Search
USPC ............... 220/582, 300, 304, 298, 803, 802, 220/801, 288, 200, 796; 215/332, 316, 200
IPC .................................. B65D 41/06; F17C 13/06
See application file for complete search history.

(56) References Cited

U.S. PATENT DOCUMENTS

| 1,623,397 | A | * | 4/1927 | Dunlap | 210/465 |
| 1,934,069 | A | * | 11/1933 | Ittner | 220/288 |
| 2,355,583 | A | * | 8/1944 | Derham et al. | 220/288 |
| 2,542,350 | A | * | 2/1951 | Paulsen | 222/499 |

(Continued)

FOREIGN PATENT DOCUMENTS

| DE | 601 03 898 T2 | 3/2005 |
| EP | 0 424 305 A1 | 4/1991 |
| EP | 1 295 551 B1 | 3/2003 |
| GB | 613 803 A | 12/1948 |

*Primary Examiner* — Robert J Hicks
(74) *Attorney, Agent, or Firm* — Cantor Colburn LLP

(57) ABSTRACT

A pressure vessel including a container and a lid for placing thereon. By twisting the lid and container relative to each another, the container and lid can be detachably locked together by a peripheral locking segments configured along the lines of a bayonet fastening. A circumferential sealing ring is in the region of the lid edge and the container edge for sealing the interior of the container against a drop in pressure when said container and lid are in the locked position. The pressure vessel including an auxiliary device or aid for correct positioning of the lid on the container. The positioning aid comprising a downward-projecting positioning element in the region of the lid edge which, when the lid is correctly positioned on top of the container, can be inserted into a recess which is open towards the top and in the region of the container edge.

12 Claims, 2 Drawing Sheets

(56) References Cited

U.S. PATENT DOCUMENTS

Figure 1:
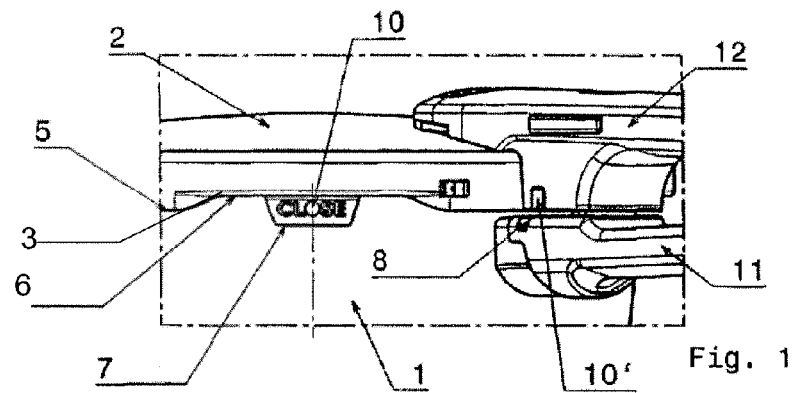

| | | | |
|---|---|---|---|
| 2,660,330 A * | 11/1953 | Keller | 220/298 |
| 2,936,093 A * | 5/1960 | Passalaqua | 220/298 |
| 3,653,533 A * | 4/1972 | Mortensen | 220/298 |
| 3,655,090 A * | 4/1972 | Rothrock et al. | 220/298 |
| 4,329,919 A * | 5/1982 | Andersen | 99/359 |
| 4,333,580 A * | 6/1982 | Sweigart, Jr. | 220/4.13 |
| 4,592,479 A * | 6/1986 | Resende | 220/203.12 |
| 5,615,607 A * | 4/1997 | Delaquis et al. | 99/409 |
| 6,378,713 B2 * | 4/2002 | Montgomery | 215/222 |
| 6,402,798 B1 * | 6/2002 | Kallsen et al. | 55/385.3 |

* cited by examiner

PRESSURE VESSEL

The invention relates to a pressure vessel consisting of a container and a lid for placing thereon, in which case, by twisting them relative to one another, the container and the lid can be detachably locked together by means of peripheral locking segments formed along the lines of a bayonet fastening and a circumferential sealing ring is provided in the region of the edge of the lid and the edge of the container for sealing the interior of the container against a drop in pressure when the container and lid are in the locked position, said pressure vessel including an auxiliary device for the correct positioning of the lid on the container.

Such pressure vessels are often used as domestic pressure cookers. With the bayonet locking systems used with said pressure cookers, the inexperienced, and even the experienced, user occasionally has a problem with correctly placing the lid on the pot and fixing it in such a way that the bayonet locking system can close reliably during the subsequent rotary movement. As an orientation aid for the correct positioning of the lid on the container, symbols on the lid, such as circles or arrows, are known, which usually have their counterpart in the form of a similar symbol on the pot handle. However, this visual aid is of only limited value in terms of facilitating placing of the lid on the pot.

Therefore, the objective of the present invention is to provide a more effective positioning and fixing aid for the bayonet locking system of a pressure vessel in order to ensure a simple locking operation even for the inexperienced user. Incorrect positioning, seizing or jamming of the lid on the edge of the container is to be avoided.

This objective is achieved with a pressure vessel of the above-mentioned type in that the positioning aid comprises a positioning element which projects downwards in the region of the edge of the lid and which, when the lid is in the correct position, can be inserted into a recess which is open towards the top and is located in the region of the edge of the container.

Thus, when placing the lid on the container, only a specific position is enabled, from which—irrespective of the number of segments and irrespective of the nominal diameter of the container—the locking operation can easily and reliably be initiated by twisting the lid relative to the container. The user is not only provided with a visual aid but with a mechanical fixing of the lid relative to the container in the precise initial position which the corresponding container segments and lid segments must adopt in order for the locking process to be initiated through the twisting of the two components relative to one another.

The form of the positioning element ideally corresponds to a somewhat smaller form of the recess. Thus the lid is prefixed relative to the container not only in height but also in an ideal radial position, so that then, with a downward sliding motion, it more or less automatically locates the container segments. Thanks to the insertion of the positioning element into the recess, the lid is fixed blind onto the container. After the prefixing step, the lid falls under its own weight into the appropriate locking position on the container. The positioning aid comprising positioning element and recess thus provide the basis for a simple closure of a pressure vessel using bayonet locking technology.

Moreover, the positioning element and recess can technically be configured in many different ways.

In one particular embodiment of the invention, the positioning element can be formed, for the sake of simplicity, as a positioning lug which projects downwards from the edge of the lid and is preferably formed in such a way as to engage in an appropriate slot provided in the handle of the container.

If the positioning element fits in the recess with only a little play in radial direction, the lid can easily assume its preferred initial position on the container for initiation of the locking operation.

The positioning element of the lid as positioning aid can thus be placed directly from above or, for ease, diagonally from above into the recess which is open at the top and is located in the region of the edge of the container. Since the lid has been positioned correctly in relation to the container, any tilting or jamming of the lid during the rotary closing movement is eliminated. However for ease of handling, it should preferably be possible to insert the positioning element into the recess diagonally from above.

If the slot for receiving the positioning lug is closed at one side in circumferential direction to form a stop, the positioning element can easily be inserted into the recess from above and from one side until said positioning lug reaches the stop, as a result of which the lid inevitably assumes the correct initial position on the container for the start of the locking operation.

As a visual aid, it is also possible to provide the positioning element and the recess with matching surface areas, thus, for example, with coloured projections, markings and/or symbols, in order further to illustrate the mode of operation of the invented pressure-vessel closure system.

Further aims, features, advantages and possible applications of the present invention are made apparent in the following description of working examples with reference being made to the attached drawings. Moreover, all the described and/or illustrated features, separately or in any combination, constitute the subject-matter of the invention, and this irrespective of their inclusion in individual claims or when referring back to preceding claims.

Figure 2A:
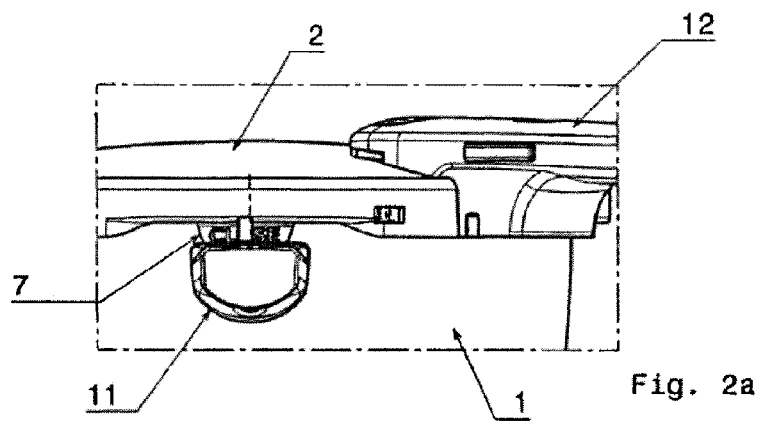
Figure 2B:
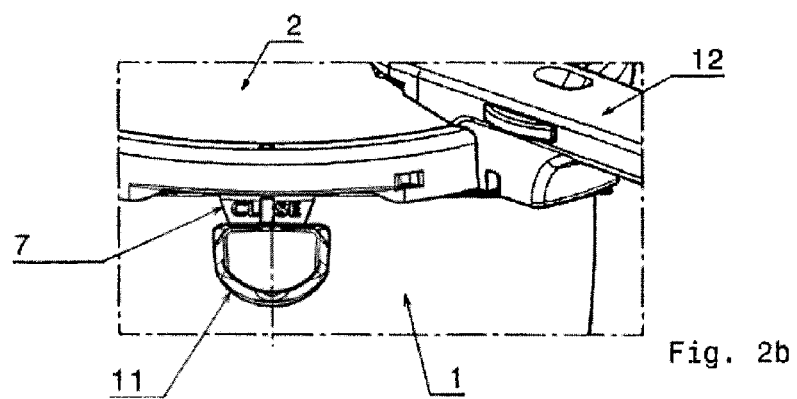
Figure 3:
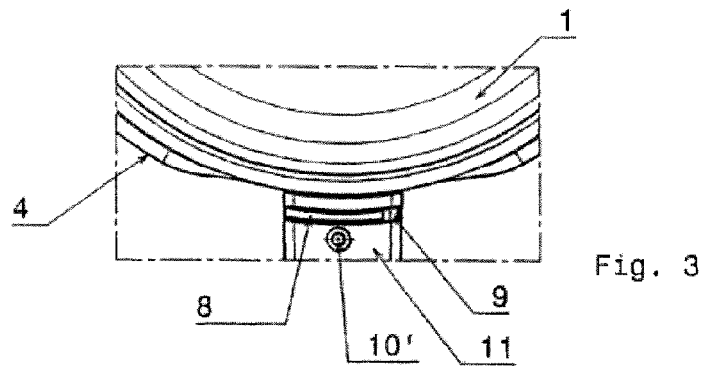
Figure 4A:
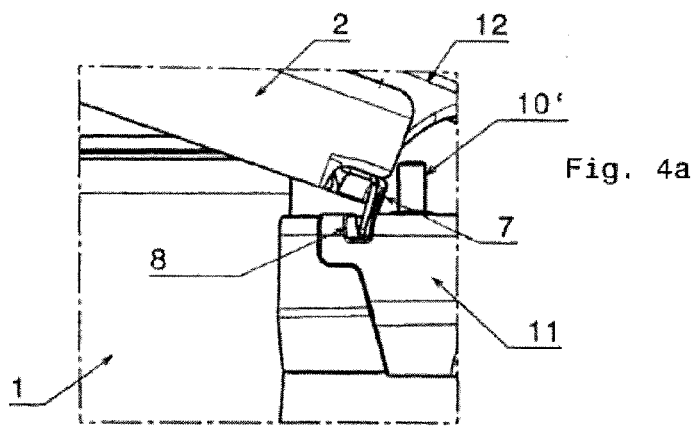
Figure 4B:
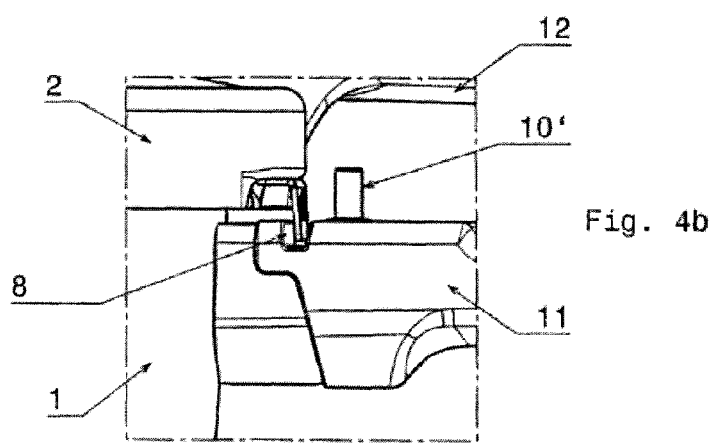

The drawings are as follows:

FIG. 1 shows schematically a section of a pressure vessel embodying the invention in the region of the positioning element, the container and lid being in the position in which they are locked together, FIGS. 2a and 2b respectively show a partial side view and an oblique view of the container and lid in the position prior to their being locked together, in which the positioning element of the positioning aid is located in a recess in the handle of the container, FIG. 3 shows a top view of a section of the container in the region of the handle of the container, and FIGS. 4a and 4b show side views of a cutaway portion of container and lid, in which the positioning element of the positioning aid is inserted, firstly diagonally and then substantially vertically, into a recess which is provided in the handle of the container and is open towards the top.

The pressure vessel embodying the invention is generally used as a domestic pressure cooker or quick-cooking pot. The pressure vessel comprises a container 1 and a lid 2 for placing thereon, which, by twisting them relative to one another, can be detachably locked together by means of peripheral locking segments 3, 4 configured along the lines of a bayonet catch. For the purpose of sealing the lid 2 relative to the container 1, there is a sealing ring (not shown) in the region of the edge 5 of the lid 2 and the edge 6 of the container 1.

In order to bring the lid 2 into the correct initial position for locking together with the container 1, a downward-projecting positioning element 7 is provided at the edge 5 of the lid 2 which, when the lid 2 is in the correct position on said container 1, can be inserted into a recess 8 which is made in the container 1 and is open towards the top. In the illustrated case, the positioning element 7 takes the form of a positioning lug which projects downwards from the edge 5 of the lid. Moreover, the positioning element 7 fits into the recess 8 with little play in radial direction so that the lid 2 is adequately centred and fixed relative to the container 1 for initiation of the locking operation through the twisting of the lid 2 relative to the container 1.

In the illustrated working example, the recess 8 in the container 1 takes the form of a slot in the handle 11 of the container suitable for receiving the positioning element 7 and in particular the positioning lug.

At one end in direction of rotation, the receiving slot has a stop 9, against which, upon its insertion from the side into the receiving slot, the positioning lug can come to rest, thus ensuring the correct starting position for the locking operation.

Provided on the front side of the positioning element 7 and on the handle 11 of the container are surface areas 10, 10' assigned to one another which, when the lid 2 is being placed on the container 1 prior to the locking operation, can be aligned with one another for additional guidance. The surface areas 10, 10' can be simple coloured markings. In the illustrated working example, the positioning lug 7' is provided on its outer front side with a round, for example red, marking element as surface area 10, and the handle 11 of the container, on its upper side near the edge 6 of the container, carries a colour-matched circular marking.

LIST OF REFERENCE NUMERALS

1 Container
2 Lid
3 Peripheral locking segments (container)
4 Peripheral locking segments (lid)
5 Edge of lid
6 Edge of container
7 Positioning element; positioning lug
8 Recess; receiving slot
9 Stop
10, 10' Surface areas
11 Handle of container
12 Handle of lid

The invention claimed is:

1. A pressure vessel comprising:
   a container;
   a lid for placing on the container, wherein by twisting the container and the lid relative to one another, the container and lid are configured to be detachably locked together by peripheral locking segments configured as a bayonet catch; and
   a circumferential sealing ring, in a region of a lid edge of the lid and a container edge of the container, for sealing an interior of the container in a locked position of the container and the lid against a fall in pressure,
   wherein the lid comprises an auxiliary device or positioning aid for facilitating a correct position of the lid on the container before a turning movement of the lid,
   wherein the auxiliary device or positioning aid has a positioning element at the lid edge and that projects downward from an outermost end of the lid edge,
   wherein the positioning element is configured to be inserted, when the lid is in the correct position on said container, into a recess which is open towards a top and is in the region of the container edge.

2. The pressure vessel according to claim 1, wherein the positioning element comprises a positioning lug formed in one piece.

3. The pressure vessel according claim 1, wherein the recess is in a handle of the container.

4. The pressure vessel according to claim 1, wherein the recess in the container comprises a slot configured to receive the positioning element.

5. The pressure vessel according to claim 1, wherein the positioning element fits into the recess with only a little play in a radial direction.

6. The pressure vessel according to claim 1, wherein the positioning element is configured to be inserted directly or diagonally from above into the recess.

7. The pressure vessel according to claim 1, wherein the recess is closed at one end in a circumferential direction to form a stop for the positioning element.

8. The pressure vessel according to claim 1, wherein the positioning element and the recess have matching surface areas.

9. The pressure vessel according to claim 2, wherein the positioning lug is formed with the edge of the lid.

10. The pressure vessel according to claim 4, wherein the recess takes the form of the slot configured to receive a positioning lug of the positioning element.

11. The pressure vessel according to claim 8, wherein the matching surface areas are a same color.

12. The pressure vessel according to claim 1, wherein the positioning element further projects from an outer surface of the lid edge and not from an inner surface of the lid edge.

* * * * *